US008635032B2

(12) United States Patent
Kalantari Khandani

(10) Patent No.: US 8,635,032 B2
(45) Date of Patent: Jan. 21, 2014

(54) SYSTEM AND METHOD FOR REMOTE SENSING AND WIRELESS ENERGY TRANSFER ON CONDUCTIVE BODY

(75) Inventor: Mehdi Kalantari Khandani, Bethesda, MD (US)

(73) Assignee: Resensys LLC, Bethesda, MD (US)

( * ) Notice: Subject to any disclaimer, the term of this patent is extended or adjusted under 35 U.S.C. 154(b) by 306 days.

(21) Appl. No.: 13/028,564

(22) Filed: Feb. 16, 2011

(65) Prior Publication Data

US 2011/0202289 A1   Aug. 18, 2011

Related U.S. Application Data

(60) Provisional application No. 61/338,144, filed on Feb. 16, 2010, provisional application No. 61/338,145, filed on Feb. 16, 2010.

(51) Int. Cl.
*G01L 1/24* (2006.01)
(52) U.S. Cl.
USPC ....... 702/42; 340/505; 340/572.4; 340/573.1; 340/5.6; 340/10
(58) Field of Classification Search
USPC .......................................................... 702/42
See application file for complete search history.

(56) References Cited

U.S. PATENT DOCUMENTS

| | | | | |
|---|---|---|---|---|
| 6,529,127 B2 * | 3/2003 | Townsend et al. | ............ | 340/505 |
| 6,544,193 B2 * | 4/2003 | Abreu | ............ | 600/558 |
| 7,256,505 B2 * | 8/2007 | Arms et al. | .................. | 290/1 R |
| 7,654,957 B2 | 2/2010 | Abreu | ............ | 600/399 |
| 8,011,255 B2 * | 9/2011 | Arms et al. | ............ | 73/862.325 |
| 2005/0017602 A1 * | 1/2005 | Arms et al. | ............ | 310/339 |
| 2008/0047363 A1 * | 2/2008 | Arms et al. | ............ | 73/862 |
| 2008/0300055 A1 * | 12/2008 | Lutnick et al. | ............ | 463/39 |
| 2009/0322557 A1 * | 12/2009 | Robb et al. | ............ | 340/870.3 |
| 2011/0028807 A1 * | 2/2011 | Abreu | ............ | 600/321 |
| 2012/0176237 A1 * | 7/2012 | Tabe | ............ | 340/539.12 |

OTHER PUBLICATIONS

Author: Haoping Huang and I. J. Won. Title: Electromagnetic detection of buried metallic objects using quad-quad conductivity. Publisher, Edition or Volume: Geophysics, vol. 69, No. 6 (Nov.-Dec. 2004); p. 1387-1393, 12 Figs. 10.1190/1.1936813.*

* cited by examiner

*Primary Examiner* — Tung S Lau
*Assistant Examiner* — Stephanie Chang

(57) ABSTRACT

A system includes a first sensor, a second sensor and a processing portion. The first sensor can wirelessly transmit a first detected signal based on a detected parameter of a structure. The second sensor can wirelessly transmit a second detected signal based on the detected parameter of a second portion of the structure. The processing portion can wirelessly transfer energy to the first sensor and the second sensor. The processing portion is operable to wirelessly transfer electromagnetic energy to enable the first and the second sensors.

28 Claims, 14 Drawing Sheets

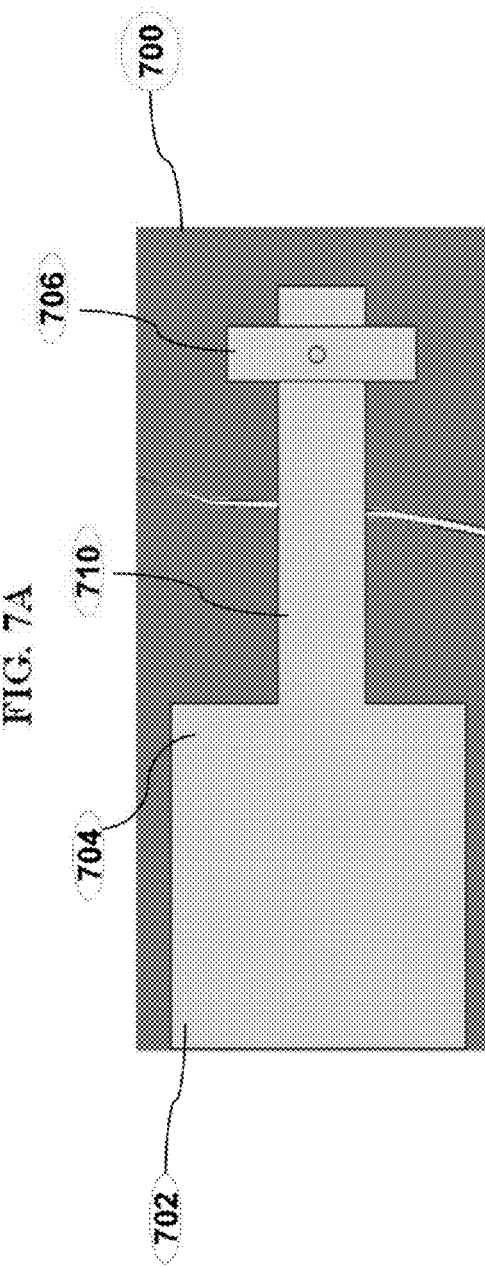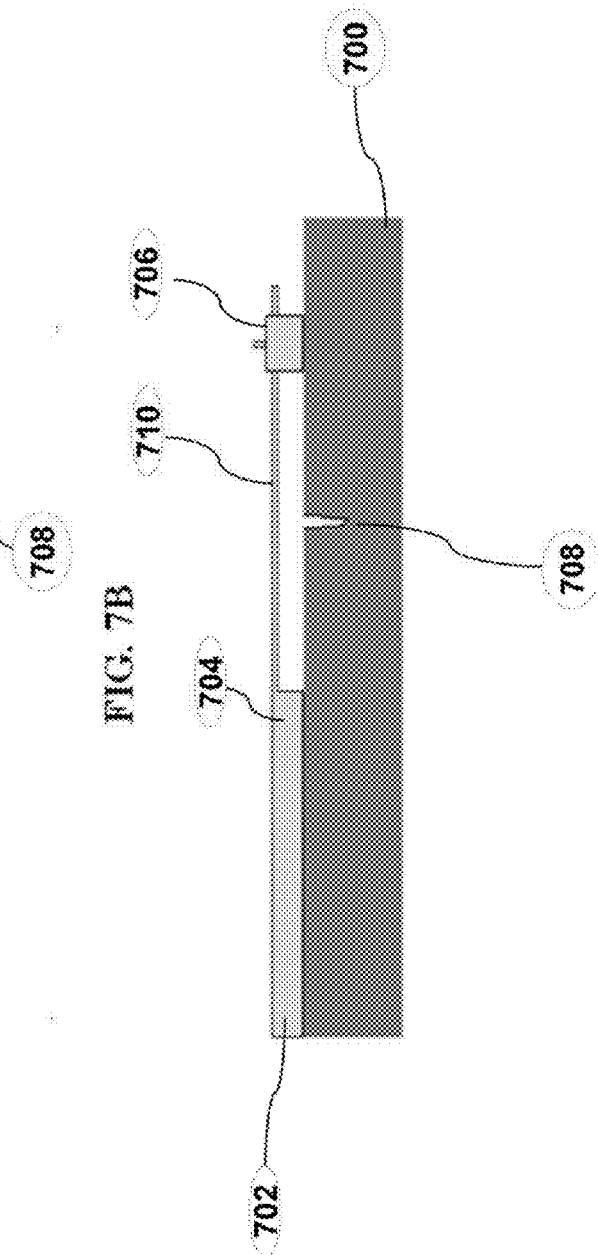
FIG. 7A
FIG. 7B

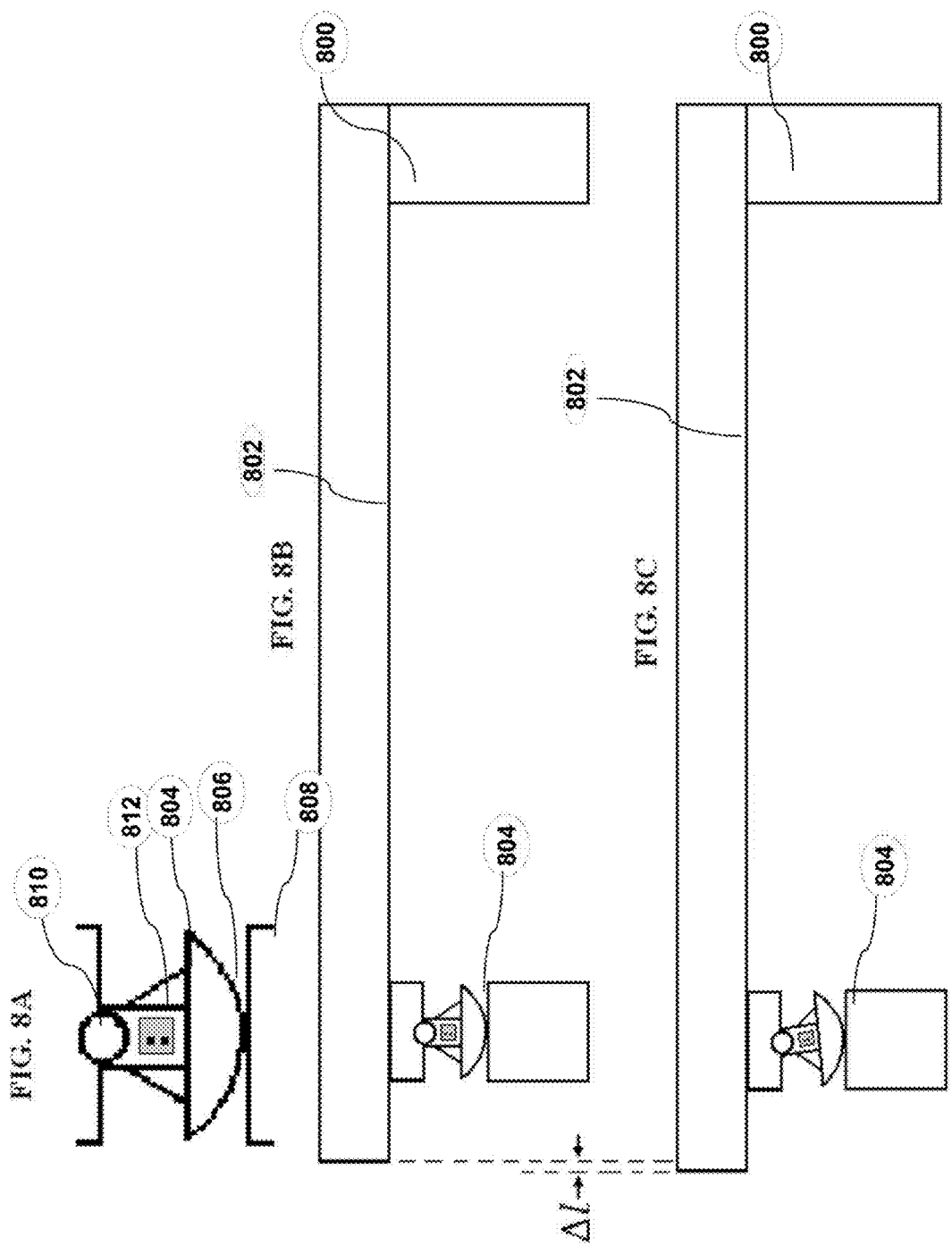

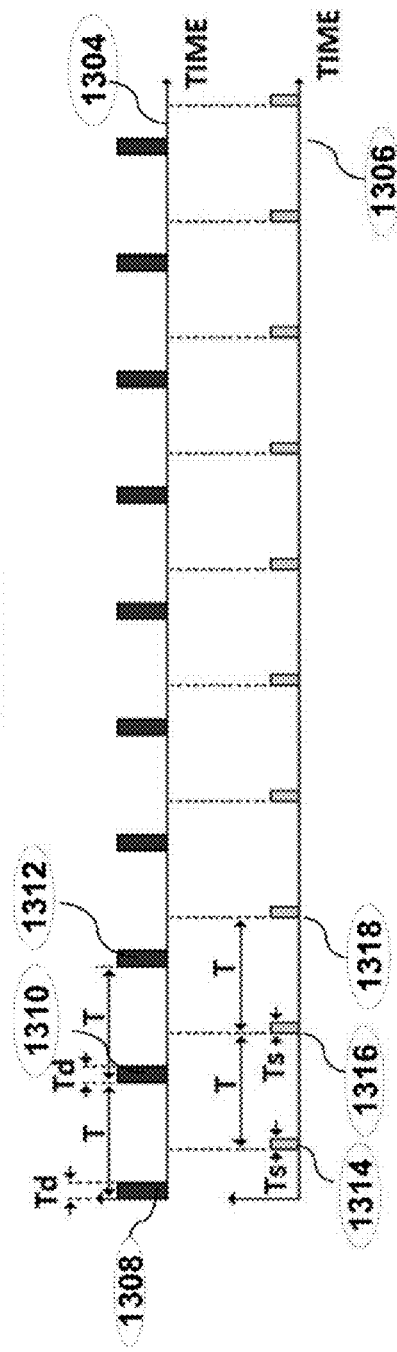
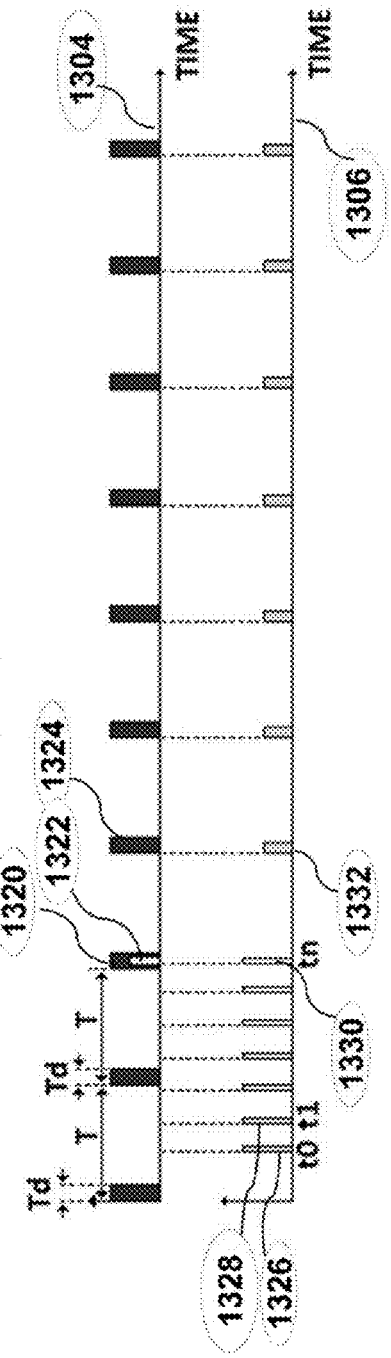

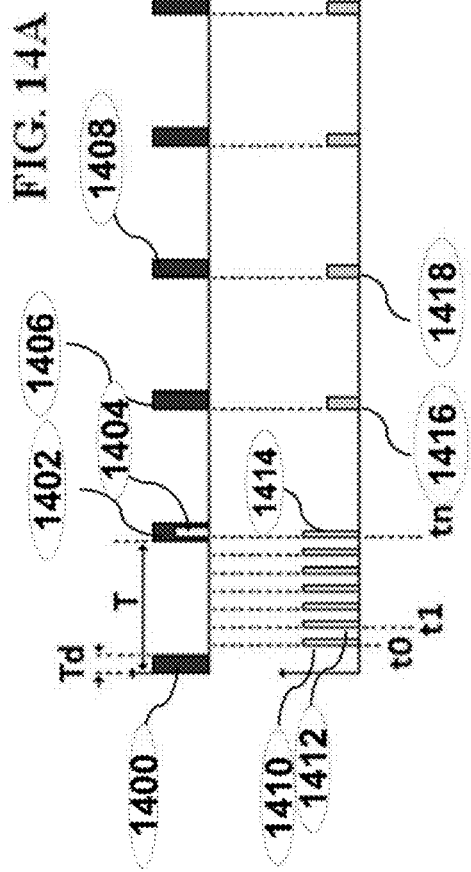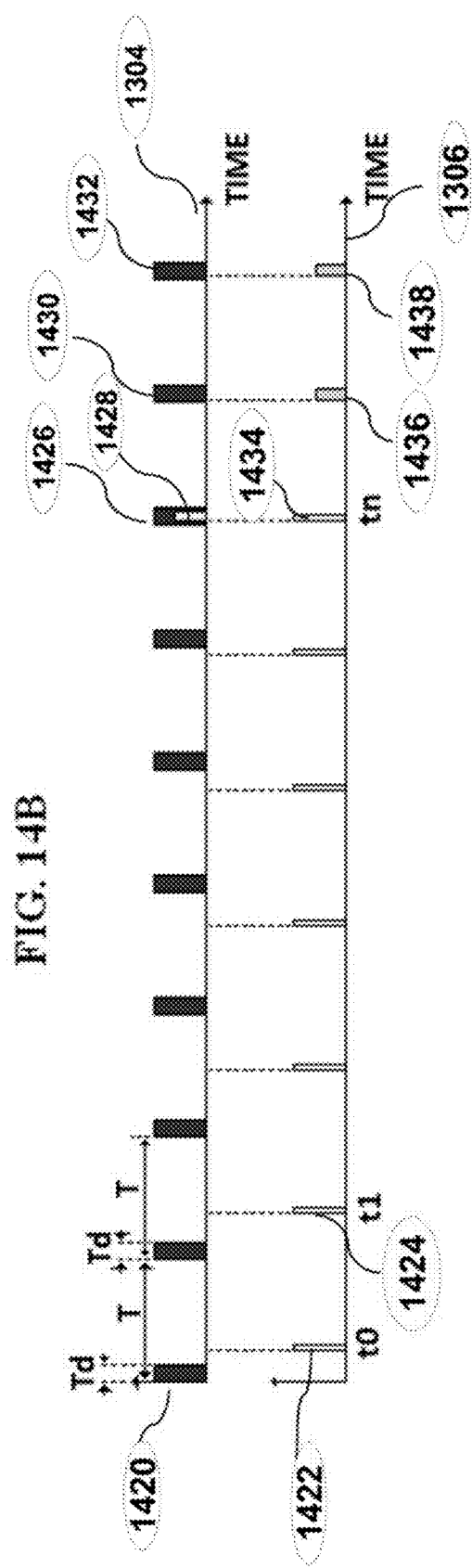
FIG. 14A
FIG. 14B

SYSTEM AND METHOD FOR REMOTE SENSING AND WIRELESS ENERGY TRANSFER ON CONDUCTIVE BODY

The present application claims priority from U.S. Provisional Application No. 61/338,144 filed Feb. 16, 2010, and from U.S. Provisional Application No. 61/338,145 filed Feb. 16, 2010, the entire disclosures of both of which are incorporated herein by reference.

BACKGROUND

Deterioration of critical infrastructure—such as bridges, pipelines, and railways—is a common, yet complex problem. Currently, manual inspection is the most common practice used to monitor the structural integrity of structures such as bridges. However, manual inspections have proven to be insufficient to ensure the safety of structures. Such inspections do not provide enough information to prevent catastrophic failures.

To ensure public safety and the continuous serviceability of critical structures such as bridges, it is imperative to develop cost effective and reliable technologies that regularly assess their structural health and integrity.

Beyond manual inspections, other existing techniques for structural health monitoring suffer from non-scalability due to the high cost of instrumentation devices, large installation costs (e.g., due to wiring needs), or high maintenance costs. Although some solutions have offered sensors with wireless communication technologies, such solutions require batteries in the sensing devices, which limit the functionality of such solutions, and requires battery replacement.

Some example conventional systems and methods for monitoring a structure will now be described with reference to FIGS. 1 and 2.

A first conventional system and method for monitoring a structure will now be described with reference to FIG. 1.

FIG. 1 illustrates an example conventional monitoring system 124 for monitoring the structural health of a structure 100.

As illustrated in the figure, structure 100 is monitored by conventional monitoring system 124, which includes sensors 102, 104, 106, 108 and 110, a data processing unit 112, and wires 114, 116, 118, 120 and 122.

Sensors 102, 104, 106, 108 and 110 are arranged to be in contact with structure 100 at positions of interest. Data processing unit 112 is arranged to be installed in proximity of structure 100.

Sensors 102, 104, 106, 108 and 110 are operable to detect parameters of structure 100 related to its structural integrity. Each of sensors 102, 104, 106, 108 and 110 may detect one or more parameters, but not necessarily the same parameters, related to structural integrity of structure 100. Data processing unit 112 is operable to read the parameters detected by sensors 102, 104, 106, 108 and 110.

Sensor 104 communicates with data processing unit 112 through wire 114. Sensor 116 is connected to data processing unit 112 through wire 116. Similarly, sensors 100, 102, 108 and 110 use wires to communicate with data processing unit 112.

In operation, conventional structural health monitoring system 124 monitors structural health and integrity of structure 100 by gathering and processing information from sensors 102, 104, 106, 108 and 110. For example, if sensor 102 is capable to monitor strain, it regularly provides readout of strain to data processing unit 112. Then data processing unit 112 may develop baseline range for normal strain readout for sensor 102 by examining long term readouts of sensor 102. After developing the baseline range, if the strain readout of sensor 102 is outside the normal baseline range, data processing unit 112 may generate an alarm. In a similar manner, data processing unit 112 processes data provided by sensors 104, 106, 108 and 110.

Structural health monitoring of a large structure similar to a bridge requires a large number of sensors similar to 102, 104, 106, 108 and 110 installed at distributed points of the structure; therefore, the cost of the conventional structural health monitoring system 124 becomes significant due to the cost of installing and maintaining the wires on the structure.

In another conventional structural health monitoring system, the information is passed wirelessly between the processor and the sensors. This will now be described with reference to FIG. 2.

FIG. 2 illustrates another example conventional monitoring system 212 for monitoring the structural health of structure 100.

As illustrated in the figure, structure 100 is monitored by conventional monitoring system 212, which includes wireless sensors 200, 202, 204, 206 and 208 and data processing unit 210.

Sensors 200, 202, 204, 206 and 208 are arranged to be in contact with structure 100 at positions of interest. Data processing unit 210 is arranged to be installed in close proximity of structure 100.

Sensors 200, 202, 204, 206 and 208 are operable to detect parameters of structure 100 related to its structural integrity. Each of sensors 200, 202, 204, 206 and 208 may detect one or more parameters, but not necessarily the same parameters, related to structural integrity of structure 100. Data processing unit 210 is operable to read the parameters detected by sensors 200, 202, 204, 206 and 208.

Wireless sensors 200, 202, 204, 206 and 208 are operable to wirelessly communicate with data processing unit 210.

In conventional monitoring system 212, the operational energy of wireless sensors 200, 202, 204, 206 and 208 are supplied either through batteries and/or energy harvesting processes.

In operation, conventional structural health monitoring system 212 monitors structural health and integrity of structure 100 by gathering and processing information from sensors 200, 202, 204, 206 and 208. For example, if sensor 200 is capable to monitor strain, it regularly provides readout of strain to data processing unit 210. Then data processing unit 210 may develop baseline range for normal strain readout for sensor 200 by examining long term readouts of sensor 200. After developing the baseline range, if the strain readout of sensor 200 is outside the normal baseline range, data processing unit 210 may generate an alarm. In a similar manner, data processing unit 210 processes data provided by sensors 202, 204, 206 and 208.

Sensors 200, 202, 204, 206 and 208 in conventional structural health monitoring system 212 require batteries in them to supply their electrical energy. As a result, the batteries in sensors 200, 202, 204, 206 and 208 run out of energy after a certain period of time since batteries need periodic maintenance and replacement even if they are connected to alternative power sources. Therefore, conventional structural health monitoring system 212 requires regular battery replacement for sensors 200, 202, 204, 206 and 208.

What is needed is a structural health monitoring system in which a large number of sensors can be easily attached to a structure without need for wiring.

BRIEF SUMMARY

The present invention provides is a structural health monitoring system and method in which a large number of sensors can easily attached to a structure without need for wiring. For cost effective and reliable monitoring a structure, some embodiments include a way to supply operation energy of the sensors.

In accordance with one aspect of the present invention, a system is provided for monitoring a parameter of a structure. The system includes a first sensor, a second sensor and a processing portion. The first sensor can detect the parameter of a first portion of the structure at a first location and can wirelessly transmit a first detected signal based on the detected parameter of the first portion of the structure at the first location. The second sensor can detect the parameter of a second portion of the structure at a second location and can wirelessly transmit a second detected signal based on the detected parameter of the second portion of the structure at the second location. The processing portion has an electromagnetic energy radiation portion. The processing portion can receive a first signal and a second signal and can wirelessly transfer energy to the first sensor and the second sensor. The first signal is based on the first detected signal, whereas the second signal is based on the second detected signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings:

FIGS. 5A-B illustrate components of an example sensor in accordance with aspects of the present invention, whereas FIG. 5A illustrates the general architecture of a sensor and FIG. 5B is an exploded side view of a portion of the sensor of FIG. 5A;

FIGS. 6A-B show another example of a sensor in accordance with an aspect of the present invention, whereas FIG. 6A illustrates a sensor attached to a structure and FIG. 6B is an exploded view of the sensor of FIG. 6A;

FIGS. 7A-B show another example embodiment of the structural health monitoring sensor in accordance with one aspect of the present invention;

FIGS. 8A-C illustrate an example method for monitoring operation of a bearing in accordance with aspects of the present invention;

FIG. 13A-C illustrate an example method for communication synchronization of a sensor with a data processing unit in accordance with an aspect of the present invention; and FIGS. 14A-B illustrates example methods for fast synchronization and a slow synchronization of sensor with the data processing unit of FIGS. 13A-C in accordance with one aspect of the present invention.

DETAILED DESCRIPTION

The present invention provides a system and method for monitoring the health of a structure. The sensors in present invention can easily be attached to a structure without need for wiring. For cost effective and reliable monitoring a structure, the system uses mechanisms that supplies operation energy of sensors. Additionally, it uses methods to synchronize sensors and to reduce operational energy of sensors. For example, a processing portion is operable to wirelessly transfer electromagnetic energy to actuate sensors. In cases that the structure has a metal or electrically conductive body, the processing portion uses the metal body to wirelessly transfer electromagnetic energy to the sensors. The sensors are therefore able synchronize the times that they detect the parameters of the structure.

The sensors in the present invention are designed to monitor specific parameters of structure that are related to its structural health. Non-limiting parameters include strain, crack creation and crack width, tilt, inclination, temperature, rotation of bearings, acceleration and vibration.

Example embodiments of systems with aspects of the present invention will now be further described with reference to FIGS. 3-14.

Figure 3:
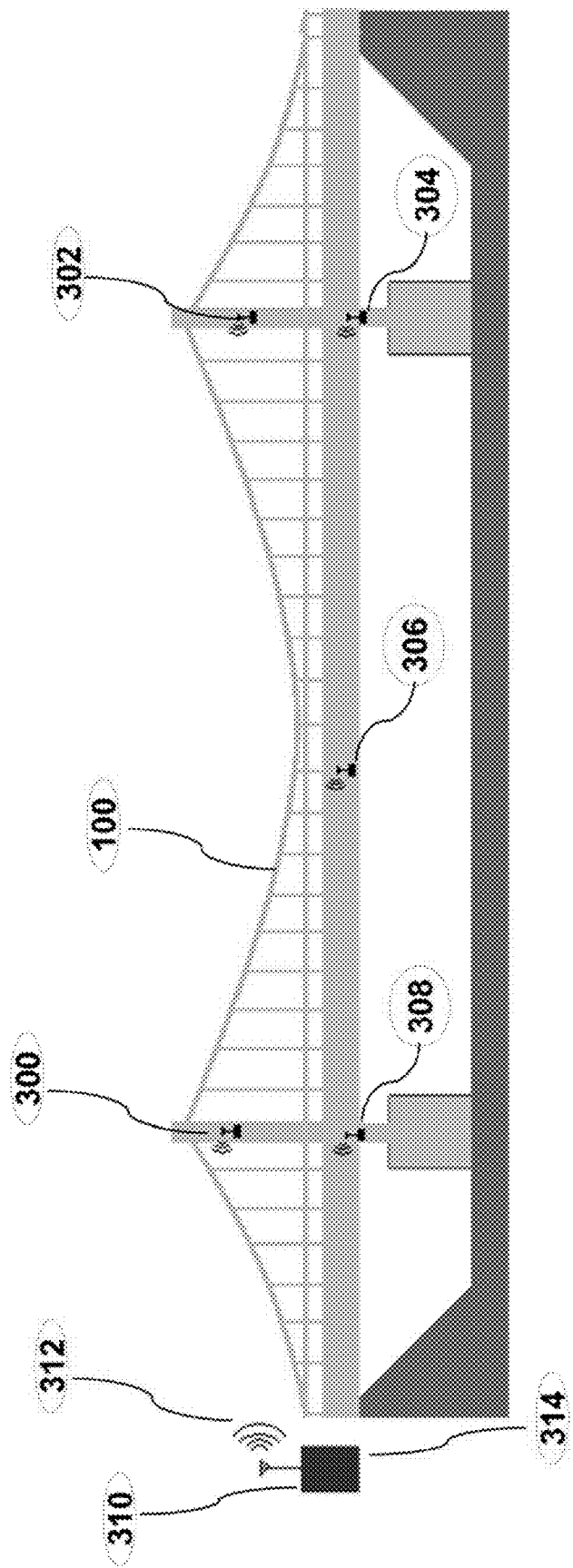
FIG. 3 illustrates an example structural health monitoring system for monitoring the structural health of a structure in accordance with aspects of the present invention.

FIG. 3 illustrates an example structural health monitoring system 314 for monitoring the structural health of structure 100 in accordance with aspects of the present invention.

As illustrated in the figure, structural health monitoring system 314 includes wireless sensors 300, 302, 304, 306 and 308 and data processing unit 310.

Sensors 300, 302, 304, 306 and 308 are arranged to be attached to structure 100 at points that it are to be monitored.

Sensors 300, 302, 304, 306 and 308 are operable to detect parameters of structure 100 related to its structural integrity. Each of sensors 300, 302, 304, 306 and 308 may detect one or more parameter, but not necessarily the same parameters, related to structural integrity of structure 100. Data processing unit 310 is operable to read the parameters detected by sensors 300, 302, 304, 306 and 308. Non-limiting examples of such parameters include strain, vibration, acceleration, deformation, crack creation and growth, temperature, tilt and inclination and orientation of bearings.

Data processing unit 310 is operable to wirelessly transfers energy to sensors 300, 302, 304, 306 and 308 using the wireless electromagnetic waves 312. In addition to electromagnetic energy transfer, electromagnetic waves 312 can be used to synchronize the measurement time or wireless communication time of sensors 300, 302, 304, 306 and 308.

In operation, structural health monitoring system 314 monitors structural health and integrity of structure 100 by gathering and processing information from sensors 300, 302, 304, 306 and 308. For example, if sensor 300 is capable to monitor strain, it regularly provides readout of strain to data processing unit 310. Then data processing unit 310 may develop baseline range for normal strain readout for sensor 300 by examining long term readouts of sensor 300. After developing the baseline range, if the strain readout of sensor 300 is outside the normal baseline range, data processing unit 300 may generate an alarm. In a similar manner, data processing unit 310 processes data provided by sensors 302, 304, 306 and 308.

Figure 4:
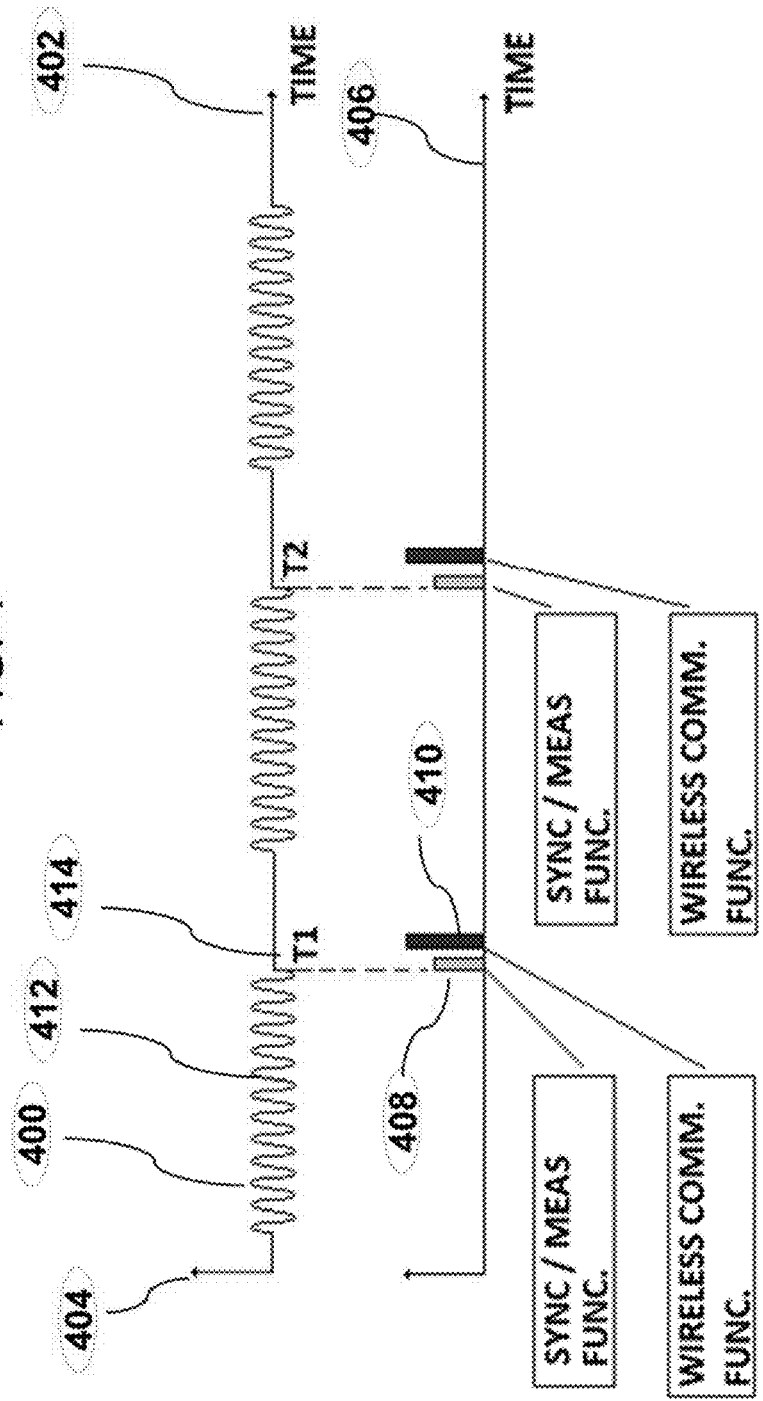
FIG. 4 illustrates synchronization of sensor with data processing unit of FIG. 3, based on wireless electromagnetic waves, in accordance with aspects of the present invention.

FIG. 4 illustrates synchronization of sensor 300 with data processing unit 310 based on wireless electromagnetic waves 312, in accordance with aspects of the present invention.

FIG. 4 shows energy radiation waveform 400 on an x axis 402 that shows time, and a y axis 404 that shows amplitude. Data processing unit 310 uses energy radiation waveform 400 to transfer energy to sensors 300, 302, 304, 306 and 308. At the same time, by changing the amplitude of energy radiation waveform 400 versus time, data processing unit 310 synchronizes certain functions within sensors 300, 302, 304, 306 and 308 with itself.

As an example FIG. 4 also illustrates synchronization of functions in sensor 300 with data processing unit 310. The functions of sensor 300 are shown versus time on an x-axis 406. By running a function 408, sensor 300 detects a parameter of interest of structure 100, and by running function 410, where sensor 300 wirelessly transmits information to data processing unit 310.

Energy radiation waveform 400 first radiates energy within a first interval 412 over which energy radiation waveform 400 has a non-zero amplitude. However, data processing unit 310 stops radiating wireless electromagnetic waves 400 at time T1. Time T1 is the end of interval 412 over which the amplitude of energy radiation waveform 400 is non-zero. Sensors 300, 302, 304, 306 and 308 detect change in energy transfer level at times T1. Since the detection of change in energy transfer level happens simultaneously in all of sensors 300, 302, 304, 306 and 308, T1 provides a reference time to synchronize each of sensors 300, 302, 304, 306 and 308 with data processing unit 310. As an example, measurement function 408 of sensor 300 is run at T1.

At time T1, sensors 300, 302, 304, 306 and 308 detect the stop of wireless electromagnetic waves 400, which provides a synchronization reference. Detecting stop point of wireless electromagnetic waves 400 will provide a trigger for execution of measurement function 408, where each of sensors 300, 302, 304, 306 and 308 detect the parameters of interest. As an example, the execution of measurement function 408 in sensor 300 happens at T1. Since T1 is synchronously detected in sensors 300, 302, 304, 306 and 308, all of these sensors detect parameters of interest of structure 100 synchronously. By using this method, wireless electromagnetic waves 312 play a dual use in health monitoring system 314. It provides the operational energy of the sensors 300, 302, 304, 306 and 308, and it is used to synchronize the times that sensors 300, 302, 304, 306 and 308 detect parameters of structure 100.

Any operation that requires synchronization among sensors 300, 302, 304, 306 and 308 may use time T1 as a reference point. Similarly, other operation that requires synchronization between any of sensors 300, 302, 304, 306 and 308 and the data processing unit 310 may also use time T1 as a reference point. For example, a wireless transmission from sensor 300 to data processing unit 310 can be done by execution of wireless communication function 410, shortly after time T1.

Similarly, time T2 provides another synchronization reference time.

Synchronization is important for two purposes. First, it can help sensors 300, 302, 304, 306 and 308 perform their measurements at the same times. Therefore, if the loading conditions of the structure are dynamic, the measurements of sensors 300, 302, 304, 306 and 308 will be performed during the same loading condition. This issue is particularly important in structures similar to highway bridges where the loading condition changes quickly with time.

The second benefit of synchronization is saving energy in the data processing unit 310. If each of sensors 300, 302, 304, 306 and 308 is synchronized with data processing unit 310 at time T1, each of sensors 300, 302, 304, 306 and 308 can wirelessly transmit their measurements to data processing unit 310 in a short interval after time T1. Therefore, data processing unit does not expect to receive wireless signals from sensors 300, 302, 304, 306 and 308 except for specific intervals after synchronization. This can help reduce energy consumption of data processing unit 310 by shutting down its wireless receiver (not shown) when it does not expect to receive wireless signals.

An example of the architectural design of a sensor 500 in accordance with aspects of the present invention will now be discussed with reference to FIGS. 5A-B.

Figure 5A:
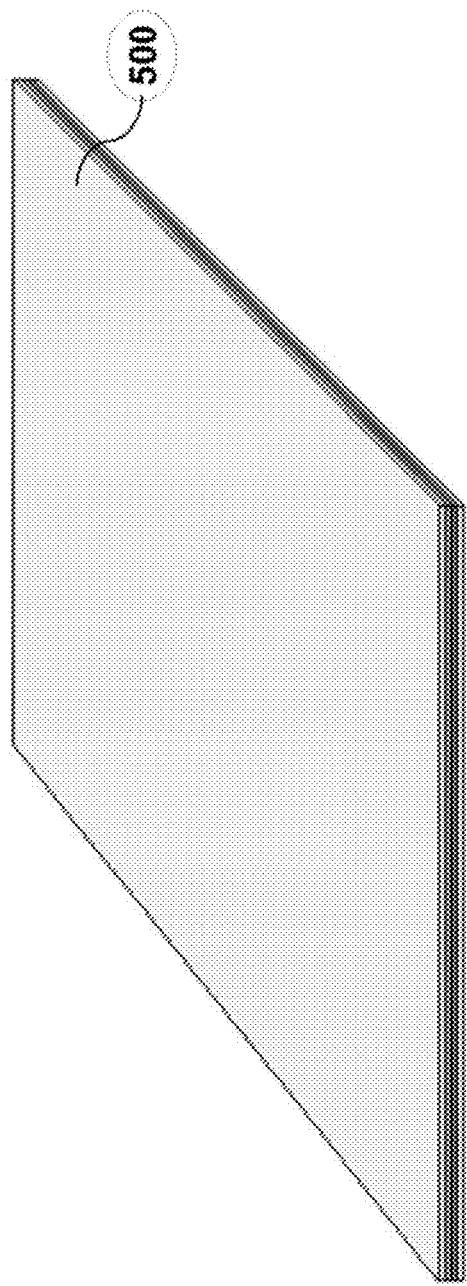
Figure 5B:
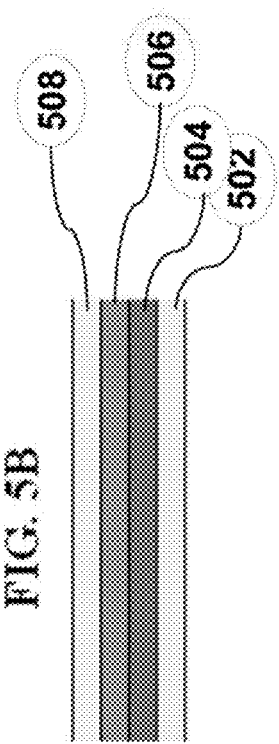

FIGS. 5A-B illustrate components of an example sensor 500 in accordance with aspects of the present invention. FIG. 5A illustrates the general architecture of sensor 500. FIG. 5B is an exploded side view of a portion of sensor 500.

As shown in FIGS. 5A-B, sensor 500 includes a transducer portion 502, an energy storage portion 504, a circuit portion 506 and a protective portion 508.

Transducer portion 502 is arranged to have physical contact to a structure to be monitored. Additionally, transducer portion 502 is arranged to be electrically connected to energy storage portion 504 and circuit portion 506. Energy storage portion 504 is arranged to either receive or supply electrical energy to circuit portion 506 and to supply electrical energy to transducer portion 502. Circuit portion 506 is arranged to have electrical connection to transducer portion 502 and the energy storage portion 504. Protective portion 508 is arranged to physically cover transducer portion 502, energy storage portion 504 and circuit portion 506.

Transducer portion 502 is operable to convert a physical parameter of a structure into an electrical property. The transducer portion 502 may include resistive strain gauges for sensing strain or thin piezoelectric devices for sensing strain or vibration. Energy storage portion 504 is operable to store electrical energy in a capacitive or electrochemical device(s) and supply the electrical energy needed for operation of transducer portion 502 and circuit portion 506. Circuit portion 506 is operable to perform signal amplification, signal processing, energy harvesting and wireless communication. Protective portion 508 is operable to protect sensor 500 against environmental conditions such as moisture, humidity, dust, etc.

In some example embodiments, transducer portion 502, energy storage portion 504, circuit portion 506 and protection portion 508 can be made of mechanically flexible material, and as a result, sensor 500 will be mechanically flexible.

Another example of a sensor 602 in accordance with aspects of the present invention will now be discussed with reference to FIGS. 6A-B.

Figure 6A:
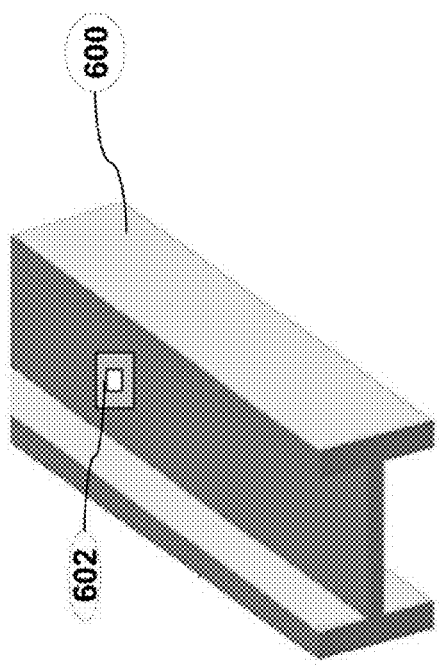
Figure 6B:
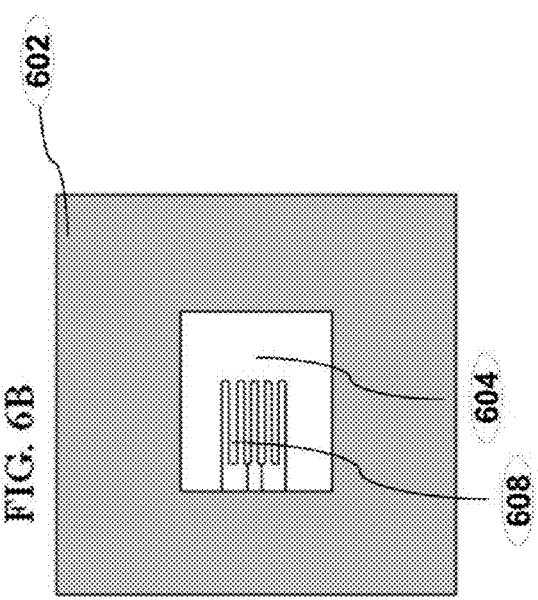

FIGS. 6A-B show another example of sensor 602 in accordance with an aspect of the present invention. FIG. 6A illustrates sensor 602 attached to structure 600. FIG. 6B is an exploded view of sensor 602.

As shown in FIG. 6B, sensor 602 includes a window 604 and a transducer element 608.

Window 604 is arranged to be within the body of sensor 600. Transducer element 608 is arranged be inside window 604.

Window 604 provides access to a portion of structure 600 after sensor 602 is attached to structure 600. Transducer element 608 is operable to convert a parameter of structure 600 into an electrical property.

Sensor 602 uses a transducer element 608 that converts a parameter of structure 600 into an electrical parameter. Sensor 602 may be attached to structure 600 using adhesive material.

After attachment of sensor 602 to structure 600, careful and intimate attachment of transducer element 604 to structure 600 is ensured through the window 604. Additionally, window 604 provides visual feedback on the correctness of the attachment of transducer element 608 to structure 600.

If transducer element 608 is attached to structure 600 by using adhesives, pressure can be applied over transducer element 608 through window 604 to ensure strong and intimate contact. Non-limiting examples of transducer element 608 are resistive strain gauges or piezoelectric elements.

Another example of a sensor 700 for monitoring a crack in a structure in accordance with aspects of the present invention will now be discussed with reference to FIGS. 7A-B.

FIGS. 7A-B show another example embodiment of the structural health monitoring sensor in accordance with one aspect of the present invention.

FIG. 7A shows the top view of a sensor 702 attached to a structure 700 to monitor a crack 708. For this purpose, sensor 702 is attached to structure at the two sides of crack 708. Attachment of sensor 702 to structure 700 is at two portions: a large portion 704 and a small portion 706. The large portion 704 and small portion 706 are at different sides of crack 708.

A sliding potentiometer 710 is arranged to be between small portion 706 and large portion 704. Small portion 706 is arranged to be able to slide over potentiometer 710.

If crack 708 grows wider (or becomes narrower), the position of small portion 706 over potentiometer 710 will change, and as a result, the electrical resistance of potentiometer 710 will change. Sensor 702 measures resistance of potentiometer 710 and uses it to monitor width of crack 708.

FIG. 7B is the side view of sensor 702 for monitoring crack 708 in structure 700.

An example method for using a sensor 812 to monitor the status of a hearing in a structure in accordance with aspects of the present invention will now explained with reference to FIGS. 8A-C.

FIGS. 8A-C illustrate an example method for monitoring operation of a bearing in accordance with aspects of the present invention.

A detailed view of a bearing is shown in FIG. 8A. To allow horizontal motion of component 802, a bearing 804 is deployed over a base 808. Bearing 804 has a round part 806. Bearing 804 is connected to component 802 through pivot 810.

As shown in FIG. 8B, a structure 800 has a component 802 whose length can change as a result of thermal expansion or contraction. It is also possible that component 802 has a small linear horizontal motion as a result of loading or stress over it.

A small change in length of component 802 as a result of temperature increase or a small linear motion of component 802 to the left as a result of loading will induce a small counterclockwise rotation in bearing 804.

Conversely, small decrease in length of component 802 as a result of temperature decrease or a small linear motion of component 802 to the right will induce a clockwise rotation in bearing 804.

FIG. 83 and FIG. 8C show the status of bearing 804 when the length of component 802 changes as a result of temperature change. In FIG. 8B, bearing 804 is in an almost upright position. However, when temperature increases, the length of component 802 will increase and bearing 804 rotates in the counterclockwise direction. The small rotation in bearing 804 as a result of temperature change is shown in FIG. 8C.

A common malfunction of bearings is that they can freeze. When bearing 804 freezes, its orientation does not change with a change of temperature or with a change in loading conditions on structure 800. Another form of malfunction in bearing 804 is when its orientation changes when temperature or loading changes, but the amount of change is smaller than the expected.

Bearing 804 may freeze as a result of inclement weather, lack of lubrication, or presence of debris in its proximity.

To monitor the state of bearing 804, a sensor 812 is attached to it. Sensor 812 uses an orientation transducer to detect tilt of bearing 804. Non-limiting examples of tilt transducers are accelerometers, electrolytic tilt sensors, inclination sensors, or magnetic sensors.

Sensor 812 may also use a temperature transducer to read the temperature. If bearing 804 is not frozen, its orientation changes slowly when temperature changes; however, if bearing 804 freezes or partially freezes, the change of temperature would not induce the expected amount of change in its orientation.

It is a common practice that structures are made of metal or electrically conductive bodies or skeletons. Using such conductive bodies provide an attractive solution to facilitate wireless electromagnetic energy transfer. An example method for electromagnetic energy transfer over a conductive body will now be explained with reference to FIG. 9.

Figure 9:
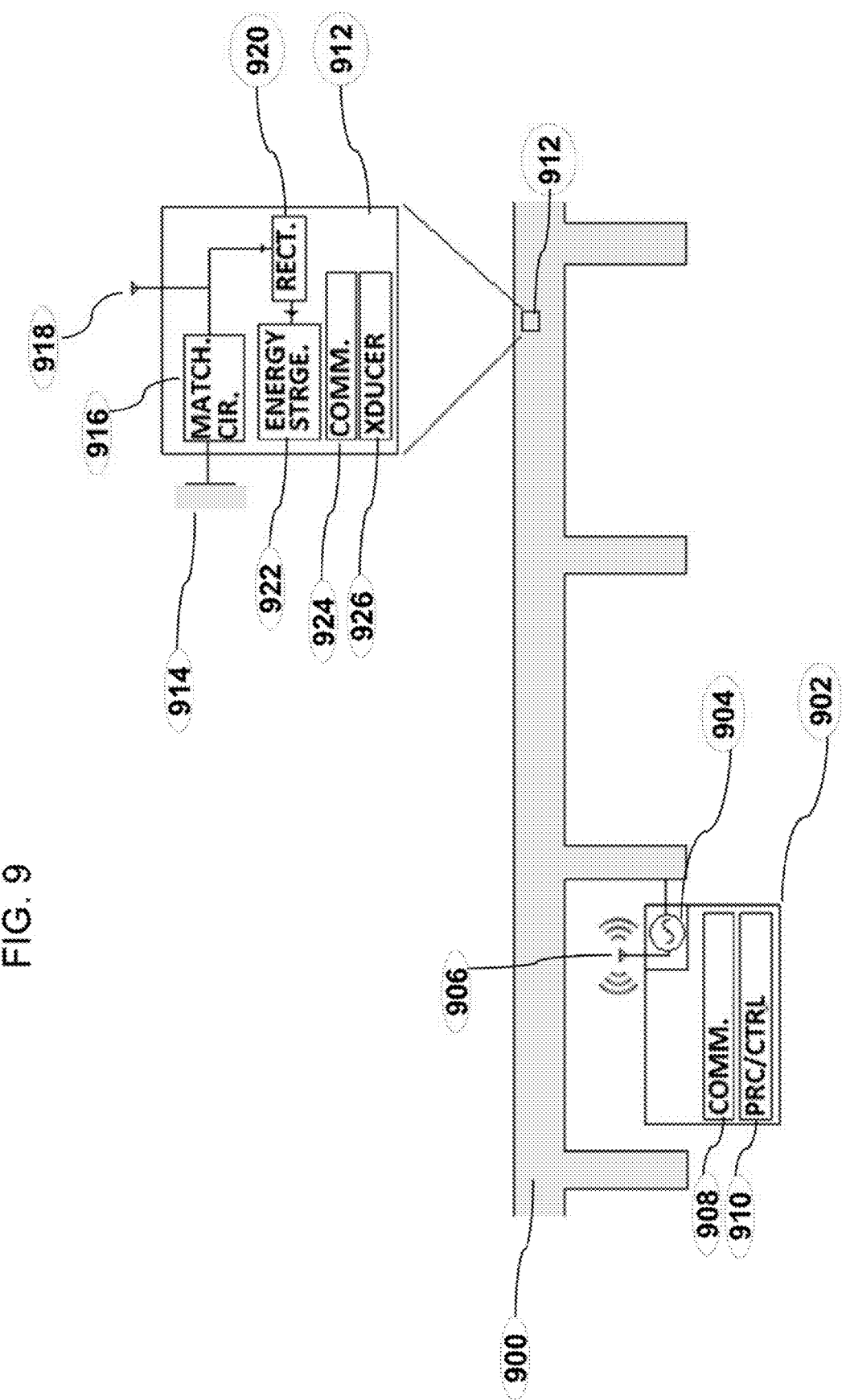
FIG. 9 illustrates an example method for electromagnetic energy transfer over an electrically conductive body (or a metal body) in accordance with aspects of the present invention.

FIG. 9 illustrates an example method for electromagnetic energy transfer over an electrically conductive body (or a metal body) in accordance with aspects of the present invention.

As shown in the figure, a conductive body 900 is used for electromagnetic energy transfer from an energy source 902 to a sensor 912. Energy source 902 is electrically connected to conductive body 900. Energy source 902 includes an electromagnetic wave generator 904, an antenna 906, communication portion 908 and a processing and control portion 910. Energy source 902 uses conductive body 900 to facilitate energy transfer to sensor 912. Sensor 912 includes a matching circuit 916, an antenna 918, a rectifier 920, an energy storage portion 922, a communication portion 924, and a transducer portion 926. Sensor 912 may use connection point 914 to create electrical connection with conductive body 900.

Energy source 902 uses electromagnetic wave generator 904, which is connected to antenna 906, to facilitate transfer of electromagnetic energy to sensor 912. Sensor 912 may be electrically connected to conductive body 900 using connection point 914. The role of matching circuit 916 is to match the electric impedance of conductive body 900 as it is observed from connection point 914 to the electrical impedance of antenna 918, so maximum electromagnetic energy is absorbed by antenna 918. The electromagnetic energy absorbed by antenna 918 is converted to direct current (DC) electricity using rectifier 920 and stored in energy storage portion 922. The sensor may use transducer 926 to detect a parameter and uses communication portion 924 to wirelessly transmit information.

In accordance with an example method of electromagnetic energy transfer, the conductive body 900 works as a common ground between antenna 906 and antenna 918. By using conductive body 900 as a common ground, the rate of energy transfer between energy source 902 and sensor 912 is significantly improved compared to the case where such a conductive common ground is not used.

In addition to electromagnetic energy transfer to sensor 912, energy source 902 may use a communication portion 908 to wirelessly communicate with sensor 912. Additionally, a processing control portion may be used in energy source 902 to control flow of energy to sensor 912 or to process information received from sensor 912.

In a similar way, sensor 912 may use a communication portion 924 for communicating with energy source 902. Also, sensor 912 may use transducer 926 to measure a parameter of interest.

Another example method for electromagnetic energy transfer over a conductive body will now discussed with reference to FIG. 10.

Figure 10:
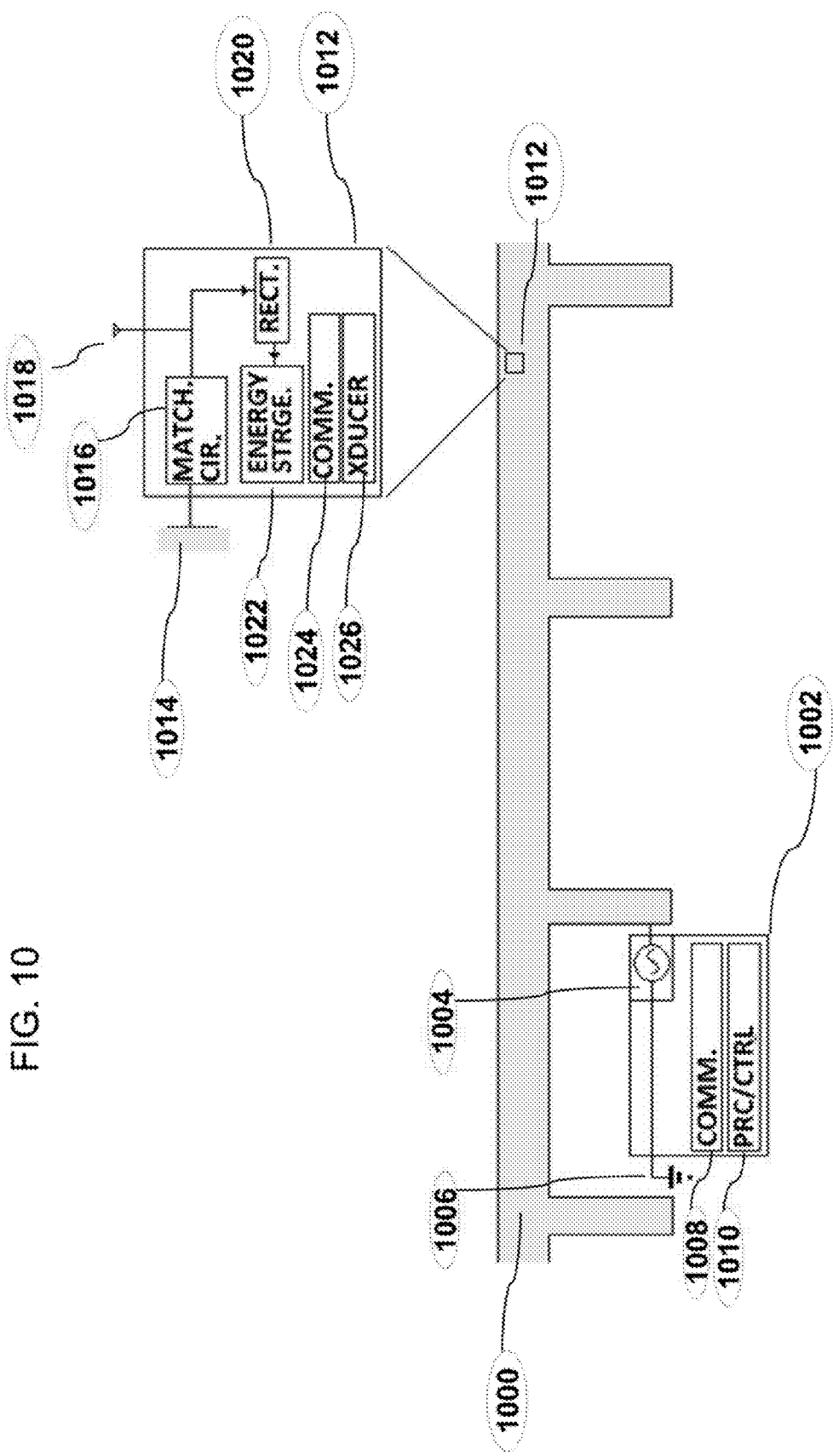
FIG. 10 illustrates another example method for electromagnetic energy transfer over a conductive body in accordance with one aspect of the present invention.

FIG. 10 illustrates another example method for electromagnetic energy transfer over a conductive body in accordance with one aspect of the present invention.

As shown in the figure, a conductive body 1000 is used to facilitate electromagnetic energy transfer from an energy source 1002 to a sensor 1012. Energy source 1002 is electrically connected to conductive body 1000. Energy source 1002 includes electromagnetic wave generator 1004, a low resistance ground 1006, communication portion 1008 and a processing and control portion 1010. Energy source 1002 uses conductive body 1000 to facilitate electromagnetic energy transfer to sensor 1012. Sensor 1012 includes a matching circuit 1016 and antenna 1018, a rectifier 1020, an energy storage portion 1022, a communication portion 1024, and a transducer portion 1026. Sensor 1012 may use connection point 1014 to create electrical connection with conductive body 1000.

Energy source 1002 generates electromagnetic energy by using an electromagnetic wave generator 1004. The electromagnetic wave generator 1004 may use a low resistance ground (or earth) 1006 as a reference point of the electrical energy that it generates. The output of electromagnetic wave generator 1004 is connected to the conductive body 1000. If used, ground point 1006 may be external to energy source 1002. Conductive body 1000 is used to transfer energy from energy source 1002 to the antenna 1018 within sensor 1012.

Sensor 1012 is installed over conductive body 1000 or in a close proximity of it. Additionally sensor 1012 may be connected to conductive structure 1000 through the connection point 1014. Sensor 1012 uses matching circuit 1016 to optimize electromagnetic energy transfer to antenna 1018. The energy received by antenna 1018 is converted to direct current (DC) electric power through the rectifier 1020 and stored in energy storage portion 1022.

With certain design considerations, conductive body 1000 may work as an antenna. In other designs, it is possible to use the conductive body as conductor, a transmission line, or a waveguide to facilitate propagation of electromagnetic energy from energy source 1002 to sensor 1012.

In addition to electromagnetic energy transfer to sensor 1012, energy source 1002 may use a communication portion 1008 to wirelessly communicate with sensor 1012. Additionally, a processing control portion may be used in energy source 1002 to control flow of energy to sensor 1012 or to process information received from sensor 1012.

In a similar way, sensor 1012 may use communication portion 1024 for communicating with energy source 1002. Also, sensor 1012 may use transducer 1026 to measure a parameter of interest.

An example embodiment of antennas used in sensors 912 and 1012 will now be discussed with reference to FIG. 11.

Figure 11:
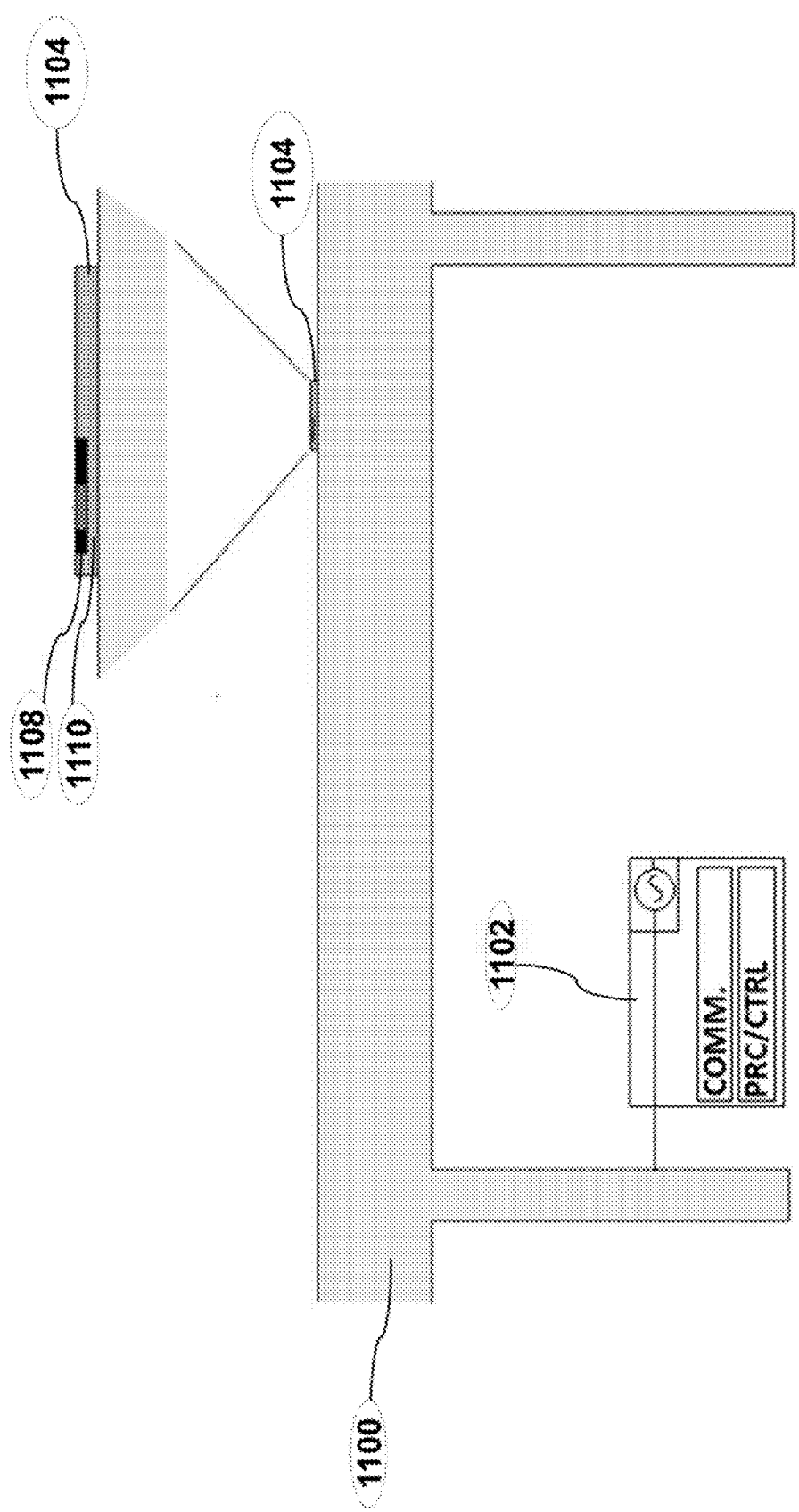
FIG. 11 shows an example embodiment of antennas used for electromagnetic energy transfer over a conductive body, in accordance with one aspect of the present invention.

FIG. 11 shows an example embodiment of antennas used for electromagnetic energy transfer over a conductive body, in accordance with one aspect of the present invention.

As shown in the figure, a sensor 1104 is installed over conductive body 1100 to receive energy form energy source 1102. In an example embodiment, sensor 1104 uses a ferrite core antenna 1108. The advantage of using ferrite core antenna is small size. As a result of using ferrite core antenna 1108, the physical dimensions of sensor 1104 will not be large even when energy source 1102 uses low frequency waves to transfer energy to sensor 1104. Dielectric material 1110 may be used to fill the space between ferrite core antenna 1108 and conductive body 1100.

Ferrite core antennas are used in applications where the antenna must be small size. In radio frequency applications, an antenna must be a fraction of the wavelength ($\lambda$) of the radio frequency. Usually, antenna sizes are $\lambda$, $\lambda/2$, $\lambda/4$, $\lambda/8$, etc. As frequency decreases, $\lambda$ and antenna lengths increase. For example, if frequency of 1 MHz is used for transmitting a signal, the free space wavelength becomes 300 meters. Therefore, even an antenna of $\lambda/8$ should be around 37.5 meters in length, which is impractical. A common practice to reduce the physical size of an antenna is to use a ferrite core antenna. Due to large permeability constant of in ferrite material, the wavelength of electromagnetic waves in the ferrite core decreases, which enables the small size of the antenna. For example, small commercial Amplitude Modulation (AM) radio receivers use a small ferrite core antenna. AM band is 520 kHz-1610 KHz, which corresponds to free space wavelength of 186-577 meters. A ferrite core antenna is sometimes called a ferrite loaded antenna.

If a ferrite core antenna 1108 is very close to a conductive surface its performance may be degraded. This is due to the fact that a large conductive body in a close proximity of an antenna would change the propagation pattern of that antenna. Dielectric material 1110 may be used to reduce the proximity effect.

In a preferred mode of operation, the wavelength of electromagnetic waves that carry energy from energy source 1102 to sensor 1104 should be large compared to the distance of sensor 1104 from energy source 1102. Therefore, it is expected that a frequency of 40 KHz to 40 MHz for the frequency of the electromagnetic waves generated at the energy source show a good performance; however, choosing the best energy depends on the geometry and size of conductive body 1100, as well as the distance between sensor 1104, and energy source 1102. It should be noted that a lot of time, since the distance of sensor 1104 and energy source 1102 is long, the wavelength of electromagnetic energy waves for transferring energy must be chosen to be large enough accordingly; this will lead to a large antenna size if non-ferrite antennas are used. However, using ferrite core antenna 1108 keeps the size of antenna in sensor 1104 reasonable.

A method for simultaneous electromagnetic energy transfer and communication over a conductive body will now be explained with reference to FIG. 12.

Figure 12:
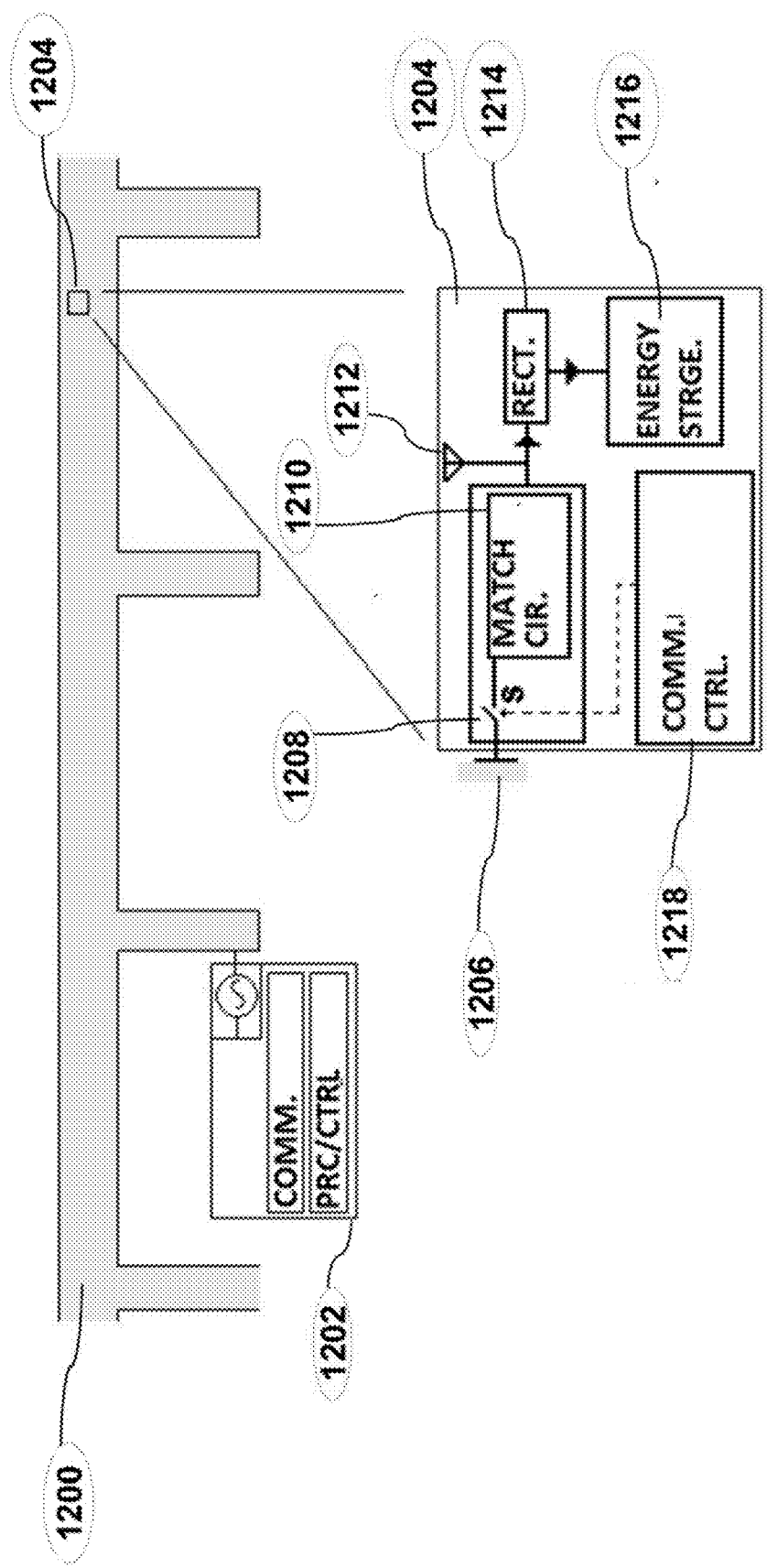
FIG. 12 illustrates an example method for combined electromagnetic energy transfer and communication on a conductive body in accordance with one aspect of the present invention.

FIG. 12 illustrates an example method for combined electromagnetic energy transfer and communication on a conductive body in accordance with one aspect of the present invention.

As shown in the figure, an electromagnetic energy source 1202 is electrically connected to a conductive body 1200 and transfers energy to a sensor 1204. Sensor 1204 is connected to conductive body 1200 through a connection point 1206 and a switch 1208. Additionally, sensor 1204 includes a matching circuit 1210, an antenna 1212, a rectifier 1214, an energy storage portion 1216 and a communication control circuit 1218.

When switch 1208 is closed, the electromagnetic energy transfer to sensor 1204 is optimized using matching circuit 1210. Sensor 1204 may use an antenna 1212 to accelerate electromagnetic energy transfer. The energy received by sensor 1204 may be converted to DC using rectifier 1214 and stored in energy storage portion 1216.

Communication control circuit 1218 manages sending information from sensor 1204 to energy source 1202 by controlling switch 1208. For this purpose, when switch 1208 is closed by communication control circuit 1218, energy is transferred to sensor 1204 at a higher rate compared to the case in which switch 1208 is open. Therefore, when switch 1208 is closed, energy source 1202 experiences a higher electromagnetic energy transfer rate compared to the case where switch 1208 is open.

By periodically changing the state of switch 1208, data is transferred from sensor 1204 to energy source 1202. For example, an open state for switch 1208 may be used to communicate binary bit 0 while a closed state for switch 1208 used to communicate binary bit 1 from sensor 1204 to energy source 1202.

Communication synchronization of a sensor with a data processing unit when the sensor and data processing unit are periodically active is now explained in reference to FIGS. 13A-B.

An example method for communication synchronization of a sensor 1302 with data processing unit 1300 in accordance with one aspect of the present invention will now be discussed with reference to FIG. 13A-C. The example method is useful when sensor 1302 does not use the synchronization method based on rate of electromagnetic energy transfer to it.

As shown in FIG. 13A sensor 1302 and data processing unit 1300 can wirelessly communicate with each other. However, to reduce energy consumption, sensor 1302 and data processing unit 1300 are not active at all times, and they are inactive most of the time, and they periodically become active. During an active period, sensor 1302 and data processing unit 1300 can transmit and receive wireless communication signals; however, sensor 1302 and data processing unit 1300 can wirelessly communicate with each other only if they are simultaneously active.

The timing of active and inactive period of sensor 1302 and data processing unit 1300 is now explained with reference to FIG. 13B.

Active time intervals of data processing unit 1300 are shown on x-axis 1304. As shown in FIG. 13B data processing unit 1300 has a first active interval 1308 with duration of $T_d$. After the end of active interval 1308, data processing unit 1300 will be inactive for a relatively long interval and a second active interval 1310 starts at T seconds after start of the first active interval 1308. In other words, T is the period over which the active intervals of processing unit 1300 repeat.

To reduce energy consumption of data processing unit 1300 T is much larger than $T_d$. The active intervals of data processing unit 1300 repeat with period T, and for example, a third active interval 1312 starts at 2 T after the start of active interval 1308.

Similarly, timing of activities of sensor 1302 is shown on x-axis 1306. Sensor 1302 has a first active interval 1314 with duration of $T_s$. After end of active interval 1314, sensor 1302 will not be active for a relatively long interval. A second active interval 1316 starts at T seconds after start of the first active interval 1314. In other words, T is the period over which the active intervals of sensor 1302 repeat.

To reduce energy consumption of sensor 1302 T is much larger than $T_s$. The active intervals of sensor 1302 repeat with period T, and for example, a third active interval 1318 starts at 2T after the start of active interval 1314.

In order to wirelessly communicate between sensor 1302 and data processing unit 1300, their active intervals must have overlap in time. For example, in the timings shown in FIG. 13B sensor 1302 and data processing unit 1300 cannot wirelessly communicate, since during any of active intervals of sensor 1302, data processing unit 1300 is not active. For example, during active intervals 1314, 1316, 1318 of sensor 1302, data processing unit 1300 is not active.

In order to make sensor 1302 capable to communicate with data processing unit 1300, sensor 1302 must synchronize its active intervals with active intervals of processing unit 1300.

An example method for synchronizing active intervals of sensor 1302 and data processing unit 1300 is now explained with reference to FIG. 13C.

In order to synchronize active intervals of sensor 1302 with active intervals of data processing unit 1300, sensor 1302 wirelessly transmits one or more synchronization request messages. Sensor 1302 wirelessly transmits a first synchronization request message 1326 at time $t_0$, however, since data processing unit 1300 is not active at $t_0$, sensor 1302 does not receive a response to synchronization request message 1326. Therefore, sensor 1302 sends a second synchronization request message 1328 at time $t_1$, but again it does not receive a response from data processing unit 1300 because data processing unit is not active at time $t_1$. Therefore, sensor 1300 continues transmitting synchronization request messages until it transmits a synchronization request messages 1330, at time $t_n$ which is transmitted during an active interval 1320 of data processing unit 1300.

Since data processing unit 1300 is active at time $t_n$, it responds to synchronization request messages 1330 by sending a synchronization reply messages 1322. Through synchronization reply messages 1322, data processing unit 1300 informs sensor 1300 about the time of its next active interval 1324. Therefore, after time $t_n$ active intervals of sensor 1302 and data processing unit 1300 will be synchronized. For example active interval 1324 of data processing unit 1300 is synchronized with active interval 1332 of sensor 1302.

In order to minimize the number of synchronization request messages, sensor 1300 may use the following procedure to generate time of synchronization request messages.

1. Choose a positive time interval $T_r$ such that $T_r$ is not greater than Td: $0 < T_r \leq T_d$.
2. Choose $t_0$ as an arbitrary time for transmission of the first synchronization request message 1326 of sensor 1302.
3. Choose $t_1$, the time of the second synchronization request message, to be: $t_1 = t_0 + T_r + k_1 * T$, where $k_1$ is an integer number such that $t_1 > t_0$.
4. Similarly, choose the time of (i+1)th synchronization request message, versus $t_{i-1}$, the time of (i)th synchronization request message to be: $t_i = t_{i-1} + T_r + k_{i+1} * T$, where $k_{i+1}$ is a integer number such that $t_i > t_0$.

In a preferred mode of operation, $T_r=T_d$. In the case where $T_r=T_d$, the above synchronization procedure is optimum in using minimum number of synchronization request messages. By choosing $T_r$ to be equal to $T_d$, two facts can be observed; first, synchronization happens with at most N synchronization request messages, wherein N is the smallest integer number such than N is greater than or equal to $T/T_r$; second, there exists values for $t_0$, the time of the first synchronization request message, such that synchronization is not possible with N−1 synchronization request messages. These two facts show that the synchronization procedure is optimal.

By choosing the values of $k_1, k_2, \ldots k_i, \ldots$ the speed of synchronization can be modified. Using $k_1$, the time between the (i+1)th and ith synchronization request messages can be modified.

An example method for choosing the synchronization speed of sensor 1302 with data processing unit 1300 by setting values of $k_1, k_2, \ldots k_i$ is now explained with reference to FIGS. 14A-B.

FIGS. 14A and 14B illustrates example methods for fast synchronization and a slow synchronization of sensor 1302 with data processing unit 1300 in accordance with one aspect of the present invention.

FIG. 14A illustrates an example method for fast synchronization of sensor 1302 with data processing unit 1300 in accordance with one aspect of the present invention.

As shown in FIG. 14A, data processing unit 1300 is not synchronized with sensor 1302 at time of active interval 1400. Therefore, at an arbitrary time to, sensor 1300 starts synchronization by transmitting a first synchronization request message 1410. The time of next synchronization request message 1412 is $t_1=t_0+T_r+k_1*T$. Therefore, in order to synchronize sensor 1302 with data processing unit 1300 as quickly as possible, it is reasonable to set $k_1=0$; therefore, synchronization request message 1412 is transmitted at earliest time after $t_0$.

Similarly, in order to minimize the time between each synchronization request message and its following synchronization request message in time, it is reasonable to set $k_1=0$, $k_2=0, \ldots k_i=0$. Using such values for $k_1, k_2, \ldots k_i$, will cause synchronization happens at the time of the first active interval 1402 of data processing unit 1300 that is after time $t_0$. As a result, synchronization happens at the fastest possible speed. Therefore, we call this example method fast synchronization.

As a result of transmitting synchronization request message 1414 by sensor 1302 when data processing unit 1300 is in its active interval 1402, sensor 1302 receives the synchronization reply messages 1404. As a result, sensor 1302 and data processing unit 1300 will become synchronized.

Fast synchronization requires sensor 1300 to transmit synchronization request messages at a high rate, therefore, it requires a fast rate of energy consumption by sensor 1302.

FIG. 14B illustrates a slow synchronization of sensor 1302 with data processing unit 1300 in accordance with one aspect of the present invention.

As shown in FIG. 14B, data processing unit 1300 is not synchronized with sensor 1302 at time of active interval 1420. Therefore, at an arbitrary time to, sensor 1300 starts synchronization by transmitting a first synchronization request message 1422. The time of next synchronization request message 1424 is $t_1=t_0+T_r+k_1*T$. Therefore, in order to synchronize sensor 1302 with data processing unit 1300 at a slower speed, it is reasonable to set $k_1=1$ or any larger integer. One reason for slow synchronization is to consume energy at a low rate by sensor 1302.

Similarly, in order to add some time between each synchronization request message and the next synchronization request message, we set $k_1=1, k_2=1, \ldots k_i=1, \ldots$. For slow synchronization, the values of $k_1, k_2, \ldots k_i, \ldots$ can independently be set to different integer numbers. For example, by using $k_1=1, k_2=1, \ldots k_i=1, \ldots$ will cause synchronization happens at the time of when synchronization request message 1434 is transmitted at the time of active interval 1426 of data processing unit 1300. Therefore, data processing unit 1300 replies to synchronization request message 1434 by sending synchronization reply messages 1428, which synchronizes sensor 1302 with processing unit 1300. For example, active interval 1436 of sensor 1302 will be synchronized with active interval 1430 of processing unit 1300. As another example, active interval 1438 of sensor 1302 will be synchronized with active interval 1432 of processing unit 1300.

Slow synchronization requires that sensor 1302 to transmit synchronization request messages at a lower rate than fast synchronization; therefore, it requires a smaller rate of energy consumption by sensor 1302 compared to the case where sensor 1302 uses fast synchronization.

In operation, sensor 1302 may use a combination of fast and slow synchronization. For example, if sensor 1302 finds that it is not synchronized with data processing unit 1300, it may use a fast synchronization procedure first. If after the fast synchronization it is not still synchronized with data processing unit 1302, it may continue by using slow synchronization to consume energy at a slower rate. Using such a combination, sensor 1302 may switch from fast synchronization to slow synchronization after transmitting at least N synchronization request messages without receiving a synchronization reply message to any of them.

An example of a situation in which such a combination of fast and slow synchronization is used is when data processing unit 1300 may be inactive or shut down for very long periods of time (e.g., for maintenance). If data processing unit is inactive for a very long period of time, using fast synchronization for a long time will cause a high rate of energy consumption in sensor 1302.

Figure 1:
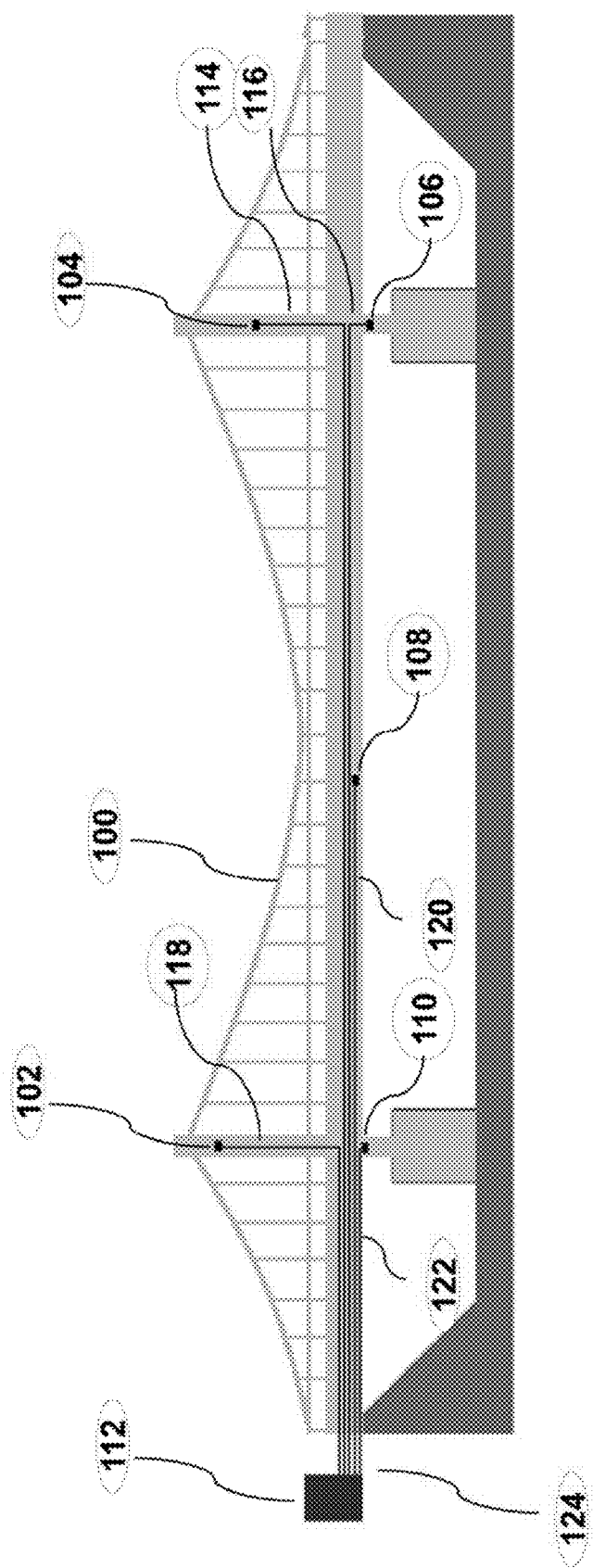
FIG. 1 illustrates an example conventional monitoring system for monitoring the structural health of a structure.
Figure 2:
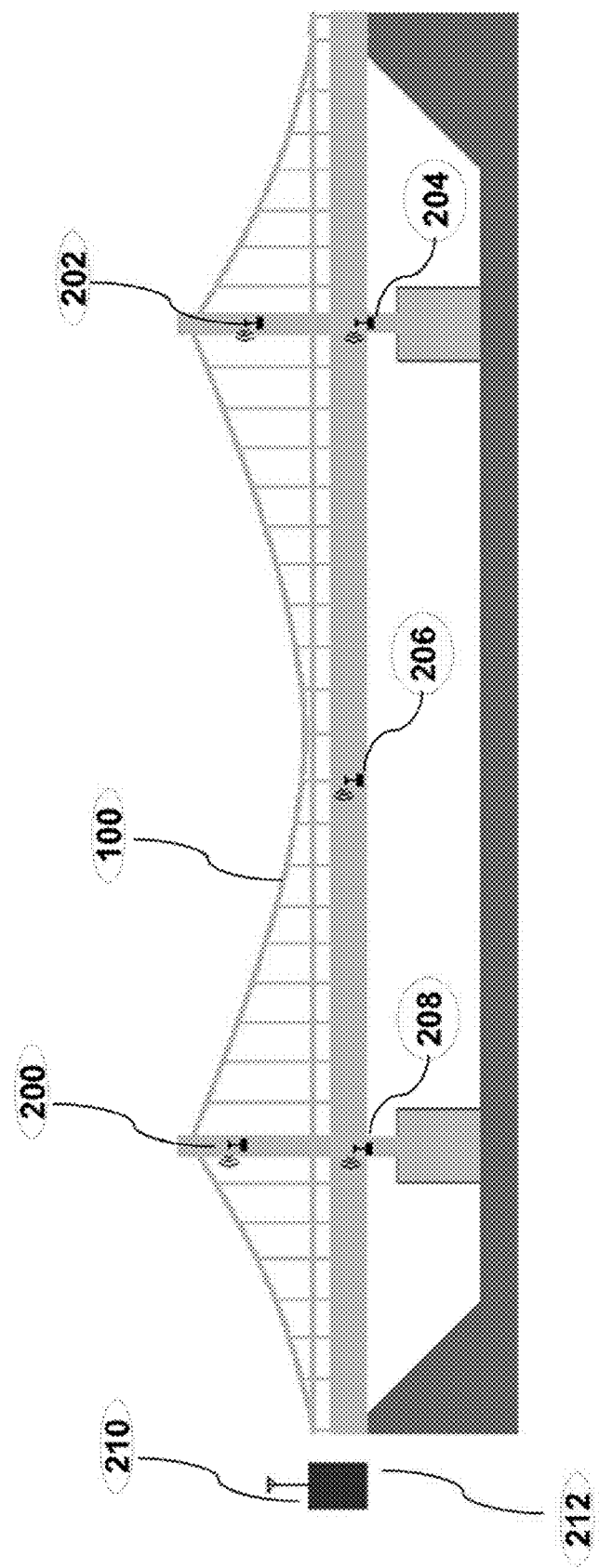
FIG. 2 illustrates another example conventional monitoring system for monitoring the structural health of a structure.

The prior art systems for structural health monitoring systems with reference to FIG. 1 and FIG. 2 has drawbacks in practical uses. The system that uses sensors wired to a data processing unit is expensive to deploy in practical uses due to high cost of wiring. The wireless system that uses batteries in sensors suffers from need for regular battery replacement cycles for batteries.

In accordance with the aspects of the present invention, the structural health monitoring system uses a system of wireless sensors and a data processing unit to monitor health of a structure. This system has several benefits: (1) in this system the data processing unit can wirelessly transmit operational energy of the sensors to them, therefore, sensors receive a reliable source of electrical energy for their operation; (2) the data processing uses simple mechanisms to synchronize the sensors; (3) when the structure has a metal or electrically conductive body, the structural health monitoring system in this invention uses that conductive body to facilitate wireless transfer of energy to the sensors; (4) sensors in the present invention are particularly designed to monitor parameters related to structural health of a structure. Non-limiting examples of such parameters are strain, crack creation and crack width, tilt and inclination, orientation on bearing systems, deformation, acceleration and vibration.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A system for monitoring a parameter of a structure, said system comprising:
   a first sensor operable to detect the parameter of a first portion of the structure at a first location and to wirelessly transmit a first detected signal based on the detected parameter of the first portion of the structure at the first location;
   a second sensor operable to detect the parameter of to second portion of the structure at a second location and to wirelessly transmit a second detected signal based on the detected parameter of the second portion of the structure at the second location; and
   a processing portion having an electromagnetic energy radiation portion and being operable to receive a first signal and a second signal and to wirelessly transfer electromagnetic energy to said first sensor and said second sensor, the first signal being based on the first detected signal, the second signal being based on the second detected signal.

2. The system of claim 1,
   wherein said first sensor is operable to operate in a first mode and a second mode,
   wherein the first mode is a sleep mode such that said first sensor is not operable to detect the parameter of the first portion of the structure at the first location and to wirelessly transmit the first detected signal,
   wherein in the second mode, said first sensor is operable to detect the parameter of the first portion of the structure at the first location and to wirelessly transmit the first detected signal, and
   wherein said first sensor is operable to transition from the first mode to the second mode based on the wireless transfer of electromagnetic energy from said processing portion.

3. The system of claim 2,
   wherein said second sensor is operable to operate in a third mode and a fourth mode,
   wherein the third mode is a sleep mode such that said second sensor is not operable to detect the parameter of the second portion of the structure at the second location and to wirelessly transmit the second detected signal,
   wherein in the fourth mode, said second sensor is operable to detect the parameter of the second portion of the structure at the second location and to wirelessly transmit the second detected signal,
   wherein said second sensor is operable to transition from the third mode to the fourth mode based on the wireless transfer of electromagnetic energy from said processing portion, and
   wherein said first sensor is operable to synchronously transition from the first mode to the second mode when said second sensor transitions from the third mode to the fourth mode.

4. The system of claim 3,
   wherein said processing portion is operable to process the first signal and the second signal,
   wherein said electromagnetic energy transfer portion is further operable to wirelessly transfer electromagnetic energy to enable said first sensor to transition from the first mode to the second mode, to enable said first sensor to detect the parameter of the first portion of the structure at the first location and to enable said first sensor to wirelessly transmit the first detected signal, and
   wherein said electromagnetic energy transfer portion is further operable to wirelessly transfer electromagnetic energy to enable said second sensor to transition from the third mode to the fourth mode, to enable said second sensor to detect the parameter of the second portion of the structure at the second location and to enable said second sensor to wirelessly transmit the second detected signal.

5. The system of claim 1,
   wherein said first sensor comprises a sensing portion, an energy storage portion, a circuit portion and a protective portion,
   wherein said sensing portion is operable to detect the parameter of a first portion of the structure at a first location and to output a parameter signal,
   wherein said energy storage portion is operable to store the wirelessly transferred electromagnetic energy from said processing portion and to provide energy to said circuit portion,
   wherein said circuit portion is operable use the energy provided by said energy storage portion to generate and wirelessly transmit the first detected signal based on the parameter signal, and
   wherein said protective portion covers said circuit portion.

6. The system of claim 5,
   wherein said sensing portion comprises a sensing layer,
   wherein said energy storage portion comprises an energy storage layer,
   wherein said circuit portion comprises a circuit layer,
   wherein said protective portion comprises a protective layer,
   wherein said circuit layer is disposed between said protective layer and said energy storage layer, and
   wherein said energy storage layer is disposed between said circuit layer and said sensing layer.

7. The system of claim 5, wherein said sensing portion comprises a piezoelectric transducer.

8. The system of claim 5, wherein said energy storage portion comprises a capacitor.

9. The system of claim 1, wherein said a first sensor comprises a strain gauge.

10. The system of claim 1, wherein said a first sensor comprises a potentiometer.

11. The system of claim 1, wherein said a first sensor is operable to detect one of the group consisting of rotation, inclination, tilt, acceleration, linear motion and combinations thereof.

12. A method of monitoring a parameter of a structure, said method comprising:
   detecting, via a first sensor, the parameter of a first portion of the structure at a first location;
   wirelessly transmitting, via the first sensor, a first detected signal based on the detected parameter of the first portion of the structure at the first location;
   detecting, via a second sensor, the parameter of a second portion of the structure at a second location;
   wirelessly transmitting, via the second sensor, a second detected signal based on the detected parameter of the second portion of the structure at the second location;
   receiving, via a processing portion having an electromagnetic energy radiation portion, a first signal based on the first detected signal;

receiving, via the processing portion, a second signal based on the second detected signal; and wirelessly transferring, via the processing portion, electromagnetic energy to the first sensor and the second sensor.

13. The method of claim 12, wherein said detecting, via a first sensor, the parameter of a first portion of the structure at a first location comprises operating the first sensor in a first mode and a second mode, wherein the first mode is a sleep mode such that the first sensor does not detect the parameter of the first portion of the structure at the first location and does not wirelessly transmit the first detected signal, wherein in the second mode, the first sensor detects the parameter of the first portion of the structure at the first location and wirelessly transmits the first detected signal, and wherein the first sensor is operable to transition from the first mode to the second mode based on the wireless transfer of electromagnetic energy from the processing portion.

14. The method of claim 13, wherein said detecting, via a second sensor, the parameter of a second portion of the structure at a second location comprises operating the second sensor in a third mode and a fourth mode, wherein the third mode is a sleep mode such that the second sensor does not detect the parameter of the second portion of the structure at the second location and does not wirelessly transmit the second detected signal, wherein in the fourth mode, the second sensor is detects the parameter of the second portion of the structure at the second location and wirelessly transmits the second detected signal, wherein said second sensor is operable to transition from the third mode to the fourth node based on the wireless transfer of electromagnetic energy from the processing portion, and wherein the first sensor is operable to synchronously transition from the first mode to the second mode when the second sensor transitions from the third mode to the fourth mode.

15. The method of claim 12, further comprising:

harvesting energy via the electromagnetic energy radiation portion, wherein said receiving, via a processing portion having an electromagnetic energy radiation portion, a first signal based on the first detected signal comprises processing, via the processing portion, the first signal, wherein said receiving, via the processing portion, a second signal based on the second detected signal comprises processing, via the processing portion, the second signal, wherein said harvesting energy via the electromagnetic energy radiation portion further comprises harvesting energy to wirelessly transfer electromagnetic energy to enable the first sensor to transition from the first mode to the second mode, to enable the first sensor to detect the parameter of the first portion of the structure at the first location and to enable the first sensor to wirelessly transmit the first detected signal, and wherein said harvesting energy via the electromagnetic energy radiation portion further comprises harvesting energy to wirelessly transfer electromagnetic energy to enable the second sensor to transition from the third mode to the fourth mode, to enable the second sensor to detect the parameter of the second portion of the structure at the second location and to enable the second sensor to wirelessly transmit the second detected signal.

16. The method of claim 12, wherein said detecting, via a first sensor, the parameter of a first portion of the structure at a first location comprises detecting, via a sensor having a sensing, portion, an energy storage portion, a circuit portion and a protective portion, wherein the sensing portion is operable to detect the parameter of a first portion of the structure at a first location and to output a parameter signal, wherein the energy storage portion is operable to store the wirelessly transferred electromagnetic energy from the processing portion and to provide energy to said circuit portion, wherein the circuit portion is operable use the energy provided by the energy storage portion to generate and wirelessly transmit the first detected signal based on the parameter signal, and wherein the protective portion covers the circuit portion.

17. The method of claim 16, wherein said detecting via a sensor having a sensing layer, an energy storage layer, a circuit layer, and a protective layer comprises detecting via a sensor having a sensing layer, an energy storage layer, a circuit layer and a protective layer such that the circuit layer is disposed between the protective layer and the energy storage layer, and wherein said detecting via a sensor having a sensing, layer, an energy storage layer, a circuit layer and a protective layer comprises detecting via a sensor having the energy storage layer disposed between the circuit layer and the sensing layer.

18. The method of claim 16, wherein said detecting via a sensor having a sensing portion, an energy storage portion, a circuit portion and a protective layer comprises detecting via a sensor having the sensing portion comprise a piezoelectric transducer.

19. The method of claim 16, wherein said detecting via a sensor having a sensing portion, an energy storage portion, a circuit portion and a protective portion comprises detecting via a sensor having the energy storage portion comprise a capacitor.

20. The method of claim 12, wherein said wirelessly transferring, via the processing portion, energy to the first sensor and the second sensor comprises transferring electromagnetic energy through a conductive portion of the structure.

21. The method of claim 20, wherein said wirelessly transferring, via the processing portion, energy to the first sensor and the second sensor comprises providing a direct connection of the processing portion to the structure to transfer electromagnetic energy through the structure to the first sensor and the second sensor.

22. The method of claim 20, wherein said wirelessly transferring, via the processing portion, energy to the first sensor and the second sensor comprises providing a capacitive coupling or inductive coupling between the processing portion and the structure to transfer electromagnetic energy through the structure to the first sensor and the second sensor.

23. The method of claim 20, wherein said wirelessly transferring, via the processing portion, electromagnetic energy to the first sensor and the second sensor comprises providing a processing portion antenna on the processing portion, providing to first sensor antenna on the first sensor and providing a second sensor antenna on the second sensor and arranging the processing portion, the first sensor and the second sensor such that the structure is a common ground.

24. The method of claim 20, wherein said wirelessly transferring, via the processing portion, electromagnetic energy to the first sensor and the second sensor comprises providing a first sensor antenna on the first sensor, providing a second sensor antenna on the second sensor and arranging the processing portion, the first sensor and the second sensor such that the structure acts as an antenna, a transmission line, or a waveguide to transfer electromagnetic energy from the processing portion to the first sensor and the second sensor.

25. The method of claim 20,
wherein said detecting, via a first sensor, the parameter of a first portion of the structure at a first location comprises detecting, via a first sensor having a first switch operable to open and close, the parameter of a first portion of the structure at first locations, and
wherein said wirelessly transferring, via the processing portion, electromagnetic energy to the first sensor and the second sensor comprises providing a first sensor antenna on the first sensor, providing a second sensor antenna on the second sensor and arranging the processing portion, the first sensor and the second sensor such that by opening and closing the first switch, to rate of electromagnetic energy transfer from the processing portion to the first sensor changes, and
wherein the change in the rate of electromagnetic energy transfer is used to wirelessly communicate between the first sensor and the processing portion.

26. The method of claim 12,
wherein said receiving, via a processing portion having art electromagnetic energy radiation portion, a first signal based on the first detected signal comprises receiving the first signal only during predetermined intervals, and
wherein said wirelessly transmitting, via the first sensor, a first detected signal based on the detected parameter of the first portion of the structure at the first location comprises wirelessly transmitting the first detected signal only during the predetermined intervals.

27. The method in claim 26, further comprising, synchronizing, via the first sensor, the times of said wirelessly transmitting a first detected signal with said receiving the first signal only during predetermined intervals by transmitting a synchronization request message during the predetermined interval and receiving a synchronization reply message from the processing portion.

28. The method in claim 27, further comprising adjusting, via the first sensor, the time interval between a first synchronization request message and a second synchronization request message to adjust the rate of energy consumption and to adjust the speed of synchronization with the processing portion.

* * * * *